United States Patent
Yogeshwar (12)

(10) Patent No.: US 6,222,886 B1
(45) Date of Patent: Apr. 24, 2001

(54) COMPRESSION BASED REDUCED MEMORY VIDEO DECODER

(75) Inventor: Jay Yogeshwar, Princeton, NJ (US)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/669,218

(22) Filed: Jun. 24, 1996

(51) Int. Cl.[7] .................. H04N 7/12; H04N 11/02; H04N 11/04
(52) U.S. Cl. .................. 375/240.23; 375/240.3; 375/240.12
(58) Field of Search .................. 348/392, 424, 348/425, 397, 398, 400, 405, 408–411, 412, 384, 390; 382/233, 235; 375/240; H04N 7/12, 11/02, 11/021

(56) References Cited

U.S. PATENT DOCUMENTS

| | | | |
|---|---|---|---|
| 4,918,541 | * | 4/1990 | Ishida et al. .................. 382/235 |
| 5,237,397 | * | 8/1993 | Mighdoll et al. .................. 358/13 |
| 5,262,854 | * | 11/1993 | Ng .................. 358/133 |
| 5,287,420 | * | 2/1994 | Barret .................. 382/235 |
| 5,329,365 | * | 7/1994 | Uz .................. 348/469 |
| 5,386,234 | * | 1/1995 | Veltman et al. .................. 349/409 |
| 5,442,400 | * | 8/1995 | Sun et al. .................. 348/409 |
| 5,444,575 | * | 8/1995 | Augenbraun .................. 360/64 |
| 5,491,515 | * | 2/1996 | Suzuki .................. 348/409 |
| 5,544,290 | * | 8/1996 | Gentile .................. 395/115 |
| 5,581,302 | * | 12/1996 | Ran et al. .................. 348/416 |
| 5,644,361 | * | 7/1997 | Ran et al. .................. 348/416 |
| 5,777,677 | * | 7/1998 | Linzer et al. .................. 348/397 |

* cited by examiner

Primary Examiner—Howard Britton
Assistant Examiner—Nhon T. Diep
(74) Attorney, Agent, or Firm—Finnegan, Henderson, Farabow, Garrett & Dunner, L.L.P.

(57) ABSTRACT

A compressed video decoder receives a stream of compressed video data in a channel buffer, and decompresses it. A portion of the decompressed video data is recompressed as intraframe data to serve as an anchor frame. The intraframe data is motion compensated, and then a reference picture is selected. The reference frame data is decompressed. Next, a region of interest is selected and stored in display memory for the decompressed form. The recompression of data to be used as an anchor frame can be done in a substantially lossless manner by using DCT with the same quantization matrix, quantizer scale, and field/frame coding type.

5 Claims, 7 Drawing Sheets

COMPRESSION BASED REDUCED MEMORY VIDEO DECODER

BACKGROUND OF THE INVENTION

1. Field of the Invention

The present invention relates to a compressed video decoder. More specifically, the present invention relates to a compression-based reduced memory video decoder, with substantially lossless compression.

2. Description of the Related Art

The most popular video encoders in present use utilize motion compensated prediction, followed by transmission of a compressed error signal, as a means of efficient compression. Some encoders use forward prediction (past reference), while other decoders use both forward and backward (future reference) prediction. The standard MPEG-1 and MPEG-2 class of video encoders use both of these two types of predictions.

The implication for a video decoder is that it must maintain a copy of these reference pictures in order to decode the picture that referenced them. An MPEG decoder, for example, must have sufficient memory to store the decoded version of at least two reference pictures, in addition to a display buffer consisting of the current picture being decoded and displayed.

A standard MPEG-2 video decoder includes a channel buffer, a variable length decoder (VLD), an inverse quantization (IQ) means, an inverse discrete cosine transform (IDCT) means, a motion compensator, an anchor frame storage, and a display memory.

In the related device, the total memory space includes memory to store incoming coded data, channel buffer, and sufficient memory in anchor frame storage to store at least two reference pictures, in addition to the display memory.

Requiring this amount of memory is disadvantageous, because memory space is expensive and accounts for the largest percentage of the cost of a video decoder.

SUMMARY OF THE INVENTION

The present invention is intended to overcome the above mentioned disadvantages in the related art by reducing the amount of memory space required in a compressed video decoder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

Accordingly, the present invention broadly relates to a method and apparatus for decoding compressed video data, comprising the steps of receiving compressed video data in a channel buffer, decompressing the compressed video data and transferring the decompressed video data to a display memory, recompressing a portion of the decompressed video data as intraframe data to be used as an anchor frame, storing the intraframe data in a compressed anchor frame storage, motion compensating the intraframe data, selecting a reference picture from the intraframe data, and decompressing a region of interest of the reference picture.

The present invention further foresees a potential difficulty with recompressing a portion of the decompressed video data. If the compression is lossy, prediction drift will occur, introducing distortion and inaccuracies in the decoded picture.

Accordingly, the present invention further comprises a method and apparatus for receiving compressed video data having a quantization matrix, a quantizer scale, and a field/frame coding type, decompressing the compressed video data, recompressing a portion of the compressed video data as intraframe data to be used as an anchor frame, the recompression using a discrete cosine transform, the quantizer matrix, the quantizer scale, and the field/frame coding type, and storing the intraframe data in a compressed anchor frame storage, motion compensating the intraframe data, and selecting a reference picture from the intraframe data. The above recompression technique is substantially lossless.

The present invention further relates to compressed video decoders comprising means for performing the above-stated steps.

The teachings of the invention further can be applied to reducing the memory space of a display buffer.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiments given below, serve to explain the principles of the invention.

DETAILED DESCRIPTION OF THE PREFERRED EMBODIMENTS

Reference will now be made in detail to the present preferred embodiments of the invention as broadly illustrated in the accompanying drawings.

The invention relates broadly to a compressed video decoder. As broadly embodied herein, a compressed video decoder will be referred to with reference numeral 10. The components of compressed video decoder 10 can be provided as a standalone video decoder, or alternatively can be a decoder built into a video encoder. Furthermore, the teachings of the compression based decoder can be used to reduce the memory for display by recompressing all picture types, in addition to the anchor frames.

Figure 1:
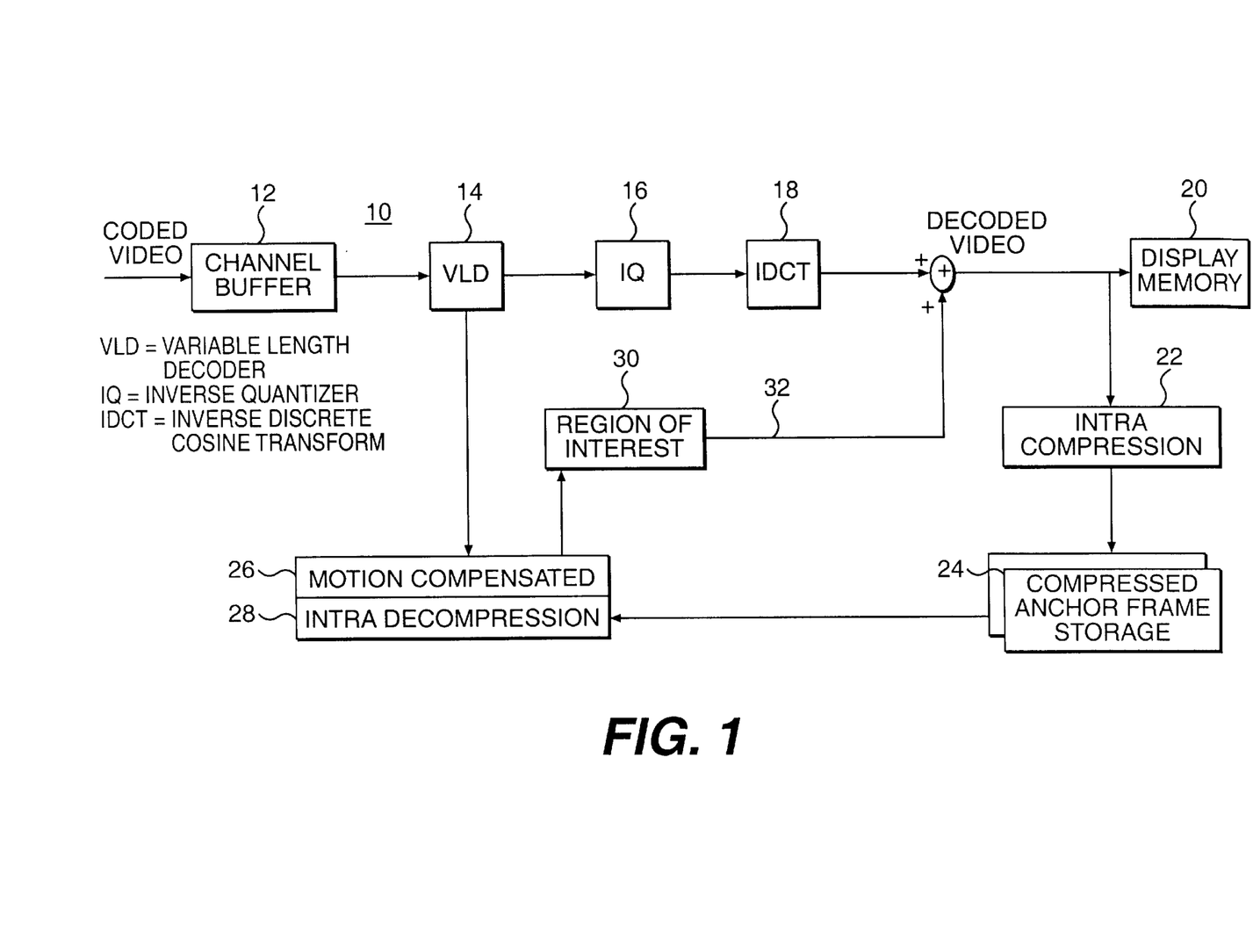
FIG. 1 is a block diagram depicting a compressed video decoder in accordance with one embodiment of the present invention.

In accordance with the invention, the compressed video decoder includes a channel buffer configured to receive compressed video data. Referring to FIG. 1, a channel buffer 12 is provided to receive a stream of coded compressed video data.

In accordance with the invention, first decompressing means are provided for decompressing the compressed video data and transferring the decompressed video data to a display memory. As broadly embodied herein, and referring to FIG. 1, a VLD 14, IQ 16, and IDCT 18, all of which are known decompressing components, are provided to decompress the coded video data and transfer the decoded video data to a display memory 20.

In accordance with the invention, means are provided for recompressing a portion of the decompressed video data as intraframe data to be used as an anchor frame, and anchor frame storage means are provided for storing the intraframe data. As broadly embodied herein, and referring to FIG. 1, a data recompression means 22 recompresses a block of data in intraframe mode to be used as a reference picture, and stores this intraframe data in a compressed data storage 24. As a result, the reference pictures are stored as compressed representations, rather than being stored as displayable data as in previous decoders.

As an example, a compression ratio of about four to one may be used. This would reduce the memory requirement for the anchor frames by a factor of four. Different compression factors and different compression techniques may be selected and still fall within the scope of this aspect of the invention. The memory size requirement is dictated by the compression factor. The compression factor and the exact compression technique selected should be such that there is very little loss of fidelity when compared to the input data, i.e., the uncompressed anchor frame data. A slight loss of fidelity may be tolerated as the error propagates only up to the start of a new group of pictures (GOP).

It is preferred that a substantially lossless recompression method be used in the recompressing means 22. As broadly embodied herein, substantially lossless compression with a reasonably high compression rate may be achieved by use of discrete cosine transform (DCT) in a specific way. According to this method, the DCT coefficient corresponding to all of the data blocks in one data macroblock must be quantized using the same quantizer scale and quantization matrix as was used in the encoder. For the case of a macroblock with no transmitted quantizer sale, it is possible to determine this value by trial and error. The proper quantizer scale to select is one with the least quantization error.

Preferably the same coding mode also should be applied to the macroblock. Hence, if a particular macroblock was encoded in "Field Mode," the DCT-based recompression should apply "Field Mode" for the macroblock. This is possible since information such as coding mode, quantizer scale, and quantization matrix typically are included in the bit stream.

An additional lossless coding step may further include the use of run length code (RLC) and variable length code (VLC).

In accordance with the invention, means are provided for motion compensating the intraframe data. Referring to FIG. 1, motion compensator 26 compensates the intraframe data in anchor frame storage 24. Such motion compensators are known in the art and will not be further described.

In accordance with the invention, means are provided for selecting a reference picture from the intraframe data, and second decompressing means are provided for decompressing a region of interest of the reference picture. As broadly embodied in FIG. 1, a means 28 selects and decompresses a reference picture, and region of interest selection means 30 selects a region of interest.

While generally it is a simple matter to index to any pixel within a picture when the picture is stored as such, it is not a simple matter for the case of compressed representation. In order to index to any macroblock of compressed data, a special index table has to be created and stored in memory along with the compressed image. The index table consists of byte offsets corresponding to each macroblock of the compressed picture.

Figure 2:
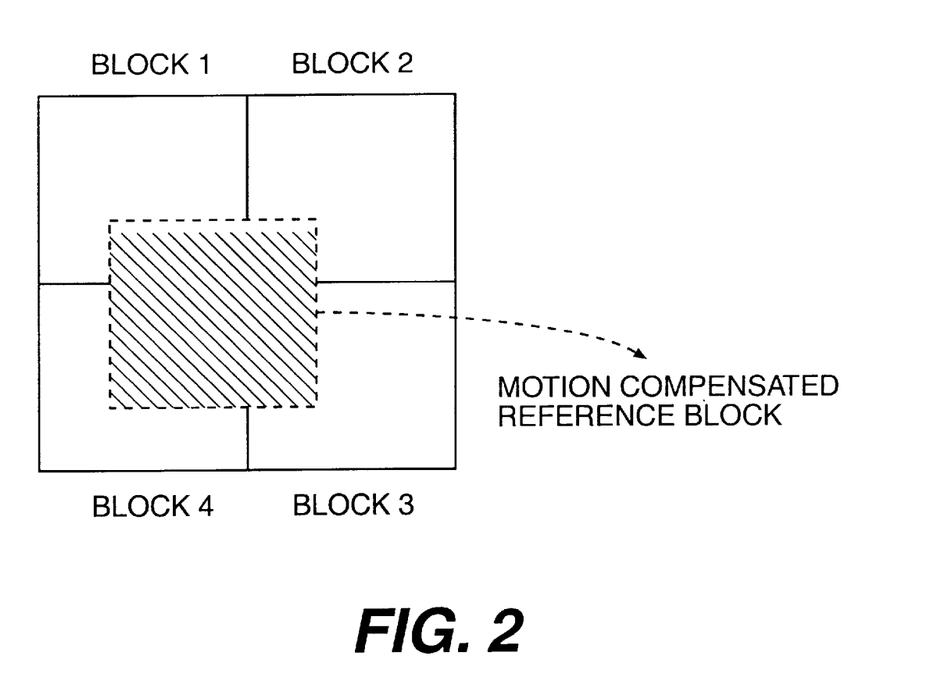
FIG. 2 is a schematic depiction of a motion compensated data reference block and a region of interest.

At most four macroblocks of the reference image need to be decompressed to make available a macroblock of interest within the reference picture. Motion vectors are used to determine which of the four macroblocks are to be selectively decompressed. The region of the prediction macroblock of interest is picked from within the four macroblocks, and used as a reference, as shown in FIG. 2.

In certain cases, two reference pictures may be required. For these cases, the recompression device recompresses a second portion of the decompressed video data as intraframe data to be used as a second anchor frame. This intraframe data also is stored, motion compensated, and a reference picture comprising at most another four macroblocks of data is selected and decompressed.

In accordance with the invention, the region of interest data is next provided to the display memory. As broadly embodied in FIG. 1, lead 32 connects region of interest selection means 30 with display memory 20.

In another aspect of the invention, compressed video decoder 10 comprises a channel buffer for receiving compressed video data, the compressed video data having a quantization matrix, a quantizer scale, and a field/frame coding type. As broadly embodied in FIG. 3, channel buffer 12 receives a stream of coded compressed video data.

As was described above, substantially lossless compression may be achieved by applying DCT to encode a macroblock of recompressed data, and further quantizing it using the same quantizer scale and quantization matrix as was used in the encoder. The following discussion illustrates this point.

We shall use capital letter notation to denote the frequency domain (DCT) representation of a signal. Thus, let the DCT of a block of data belonging to the intra picture be I. This data is first quantized, and then inverse-quantized prior to storage as a reference picture. Let this representation be called I'. Thus, $$I' = IQ_{q,Q}(Q_{q,Q}(I)) \quad \text{(EQ 1)}$$

where $IQ_{q,Q}$ represents the process of inverse quantization using a quantizer scale q, and using the quantizer matrix Q, and $Q_{q,Q}$ represents the process of quantization. The subscripts again denote the quantization parameters. The process of quantization and inverse quantization when applied to an incoming signal, introduces an error called quantization error. This is illustrated by $$IQ_{q,Q}(Q_{q,Q}(I)) = I + E_{q,Q} \quad \text{(EQ 2)}$$

where $E_{q,Q}$ represents the quantization error. Combining equations 1 and 2, we see $$I' - I = E_{q,Q} \quad \text{(EQ 3)}$$

Equation 3 shows that the representation of Intra picture in memory differs from the original by an amount equal to the quantization error.

Figure 4:
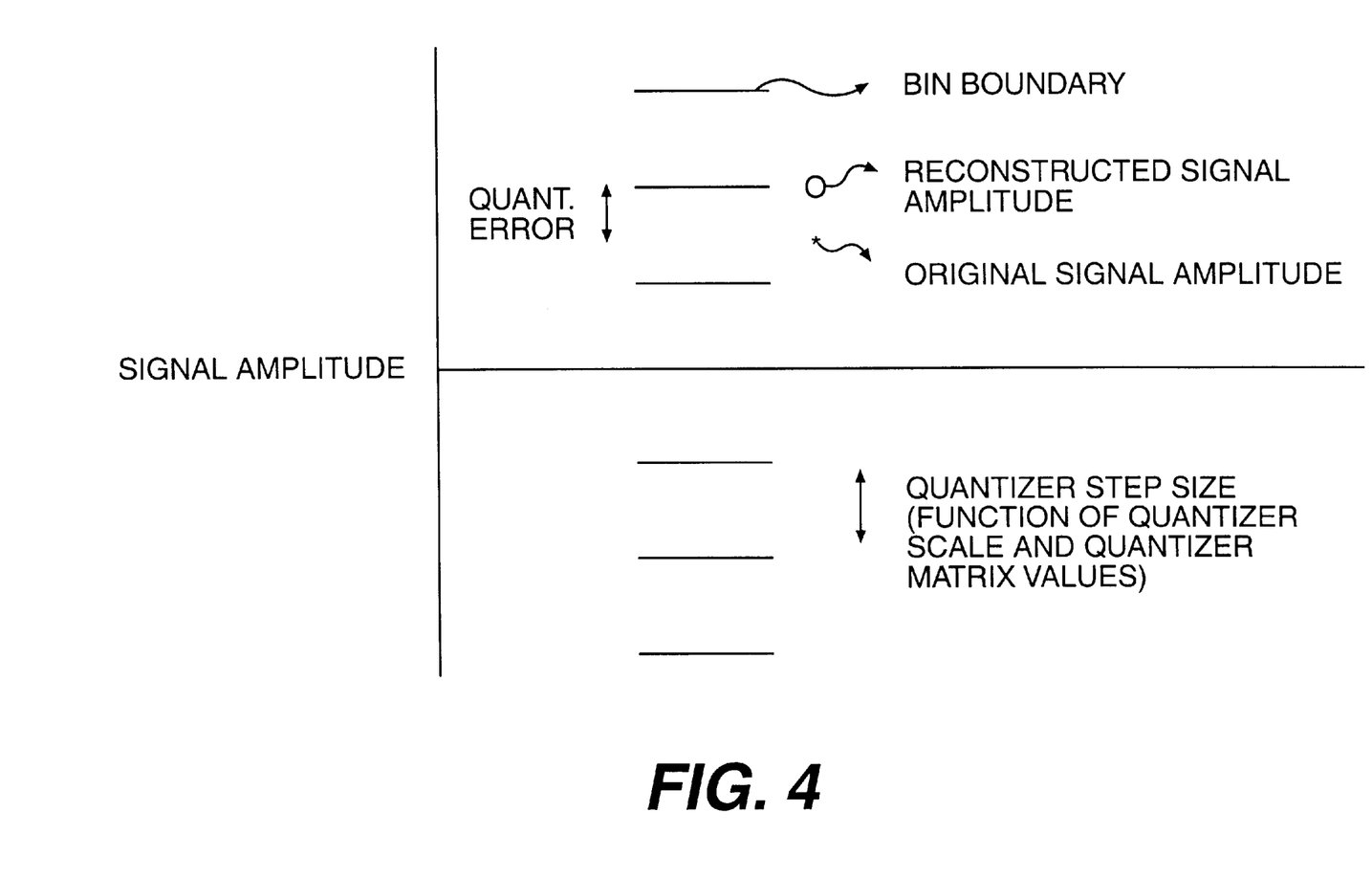
FIG. 4 is a schematic illustrating a process of signal quantization.

FIG. 4 explains the nature of quantization error. The figure shows that quantization error occurs when the frequency component of a signal does not fall on the bin boundaries corresponding to the step size of the quantizer, determined by the two quantization parameters (q,Q).

The error is equal to the difference between the signal frequency component and the nearest bin boundary. Thus, after one round of quantization and inverse quantization, the resulting signal frequency component is aligned with one of the bin boundaries of the quantizer. As a result, the second round of quantization with the same bin sizes and boundaries produces no further error. Thus, $$IQ_{q,Q}(Q_{q,Q}(I'))=I' \quad \text{(EQ 4)}$$

The same logic applies to the case of predicted or 'P' pictures $$P'-P=E_{q,Q} \quad \text{(EQ 5)}$$

Here, $E_{q,Q}$ represents the quantization error in encoding the 'P' picture signal. The effect of this error is similar to the case of 'I' picture, in that the frequency components of the signal P' are perfectly aligned to one of the bin boundaries corresponding to the quantizer (q,Q) applied to the P picture block. For the case of 'P' pictures, although it is the prediction error signal that is compressed, and $E_{q,Q}$ corresponds to the quantization error of the prediction error signal, ultimately, it is the same error that differentiates the signal P' from P. In other words, the error in the representation of the 'P' picture signal is equal to the quantization error of the prediction error signal. By this argument, $$IQ_{q,Q}(Q_{q,Q}(P'))=P' \quad \text{(EQ 6)}$$

Note that the second round of quantization leaves the signal unchanged. It is important to note that this is true only when the quantization is applied to the same data set as in the first round, and the quantization parameters are also exactly the same. The implication of this in the decoder is that the quantization parameters and the coding mode (field/frame) should be saved along with the compressed anchor signal.

The process of signal quantization is depicted broadly in FIG. 4. As a result of quantization, the original signal amplitude is reconstructed as the value of the nearest bin boundary. The quantization error is equal to the difference in the original and reconstructed signal amplitude. Since the reconstructed signal falls on the bin boundary in FIG. 4, a second point of quantization does not introduce additional quantization error.

Figure 5:
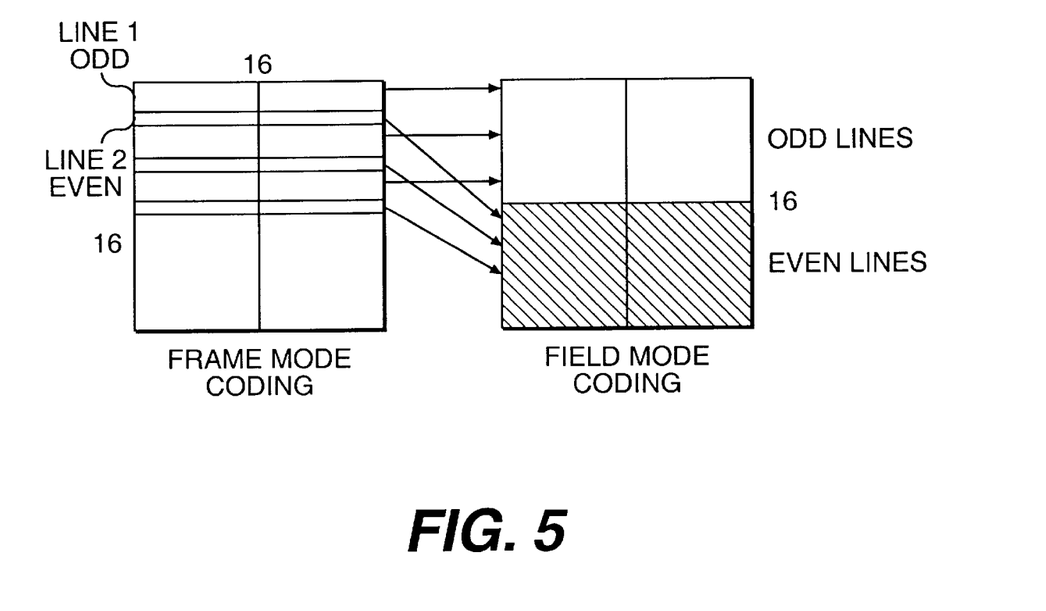
FIG. 5 is a schematic depicting field/frame macroblock coding.

Preferably the compressed video data stream also includes a field/frame coding type. Field coding suggests that a macroblock is separated into a set of blocks corresponding to odd lines, and a second set of blocks corresponding to even lines, as broadly shown in FIG. 5.

In accordance with the invention, first decompressing means are provided for decompressing the compressed video data and transferring the decompressed video data to a display memory. As broadly embodied in FIG. 3, the decompressing means include VLD 14, IQ 16, and IDCT 18, to decompress the video data and transfer the decompressed video data to display memory 20.

In accordance with the invention, discrete cosine transform means are provided for recompressing a portion of the decompressed video data as intraframe data, to be used as an anchor frame, using a discrete cosine transform, the quantizer scale, the quantization matrix, and the field/frame coding type for the recompression. As broadly embodied in FIG. 3, DCT 40 recompresses a portion of the decompressed data in display memory 20 to serve as an anchor frame. The same quantization scale and quantizer matrix are applied at block 42. Furthermore, DCT is applied to the macroblock in the same coding mode as was done originally. Thus, if frame mode coding was indicated in the bit stream, then frame mode coding is used in the recompression. In this manner, substantially lossless compression is achieved.

Figure 6:
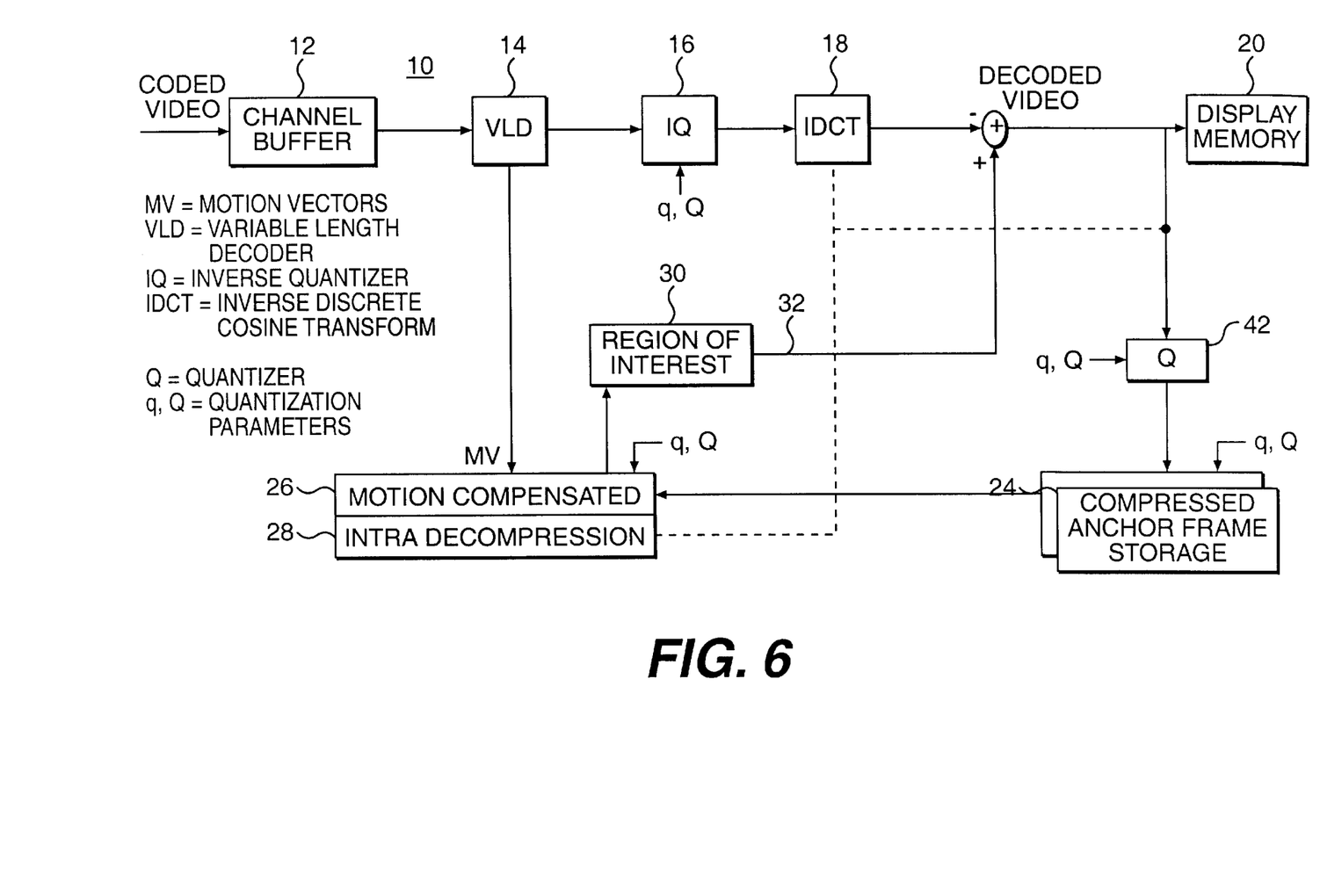
FIG. 6 is a block diagram depicting an alternative to the embodiment depicted in FIG. 3.

An alternative method for using DCT for the recompression is depicted broadly in FIG. 6. In this alternative embodiment, IDCT 18 time shares between serving as an IDCT for data decompression, and as a DCT for recompression of selected data to be used as an anchor frame. IDCT 18 also time shares with IDCT 18 and IDCT 44. The embodiment of FIG. 6 offers the advantage of not requiring a separate DCT 40.

Figure 3:
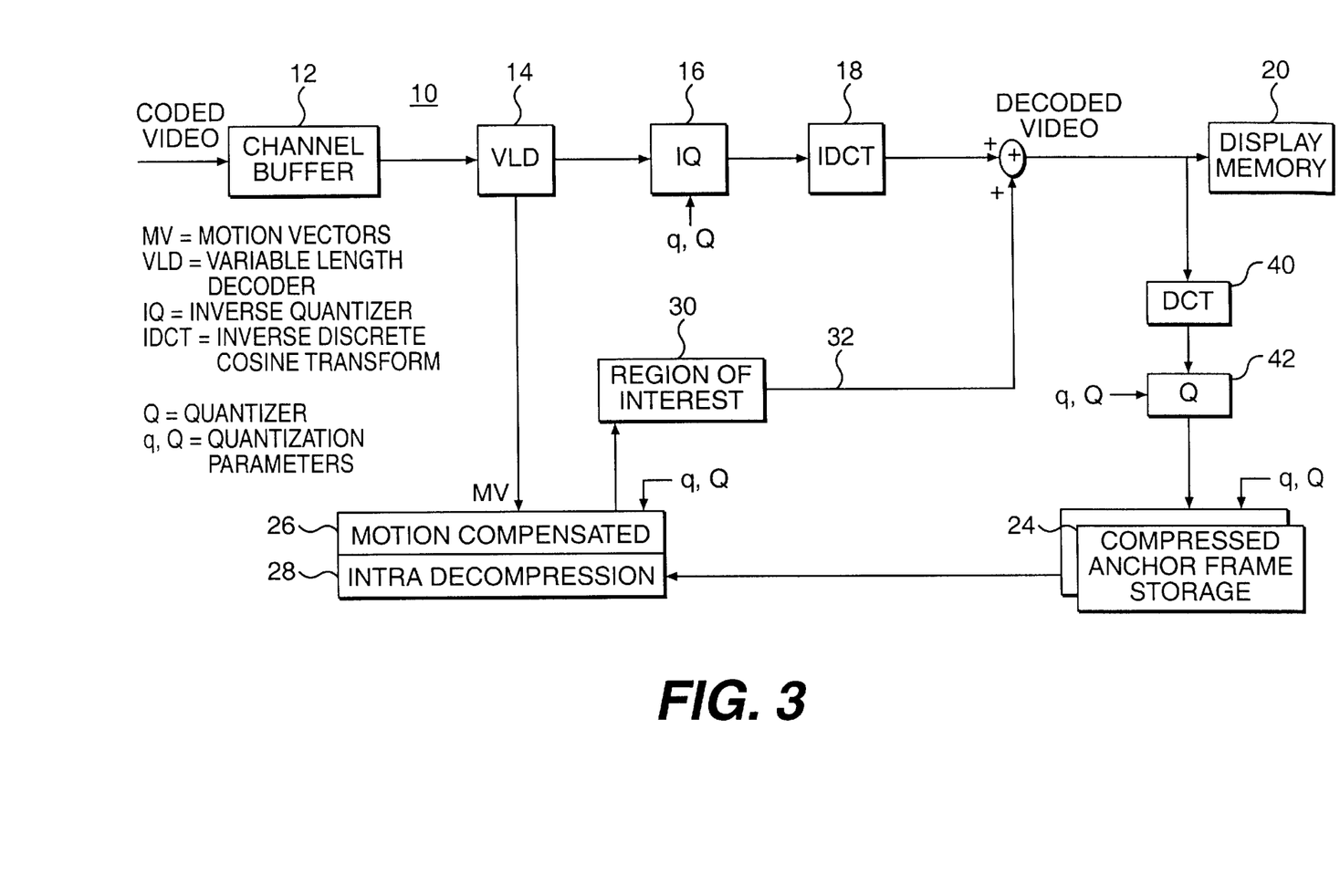
FIG. 3 is a block diagram depicting a compressed video decoder in accordance with another embodiment of the present invention.

In accordance with the invention, and as broadly embodied in FIG. 3, the decoder further includes anchor frame storage means for storing the intraframe data, means for motion compensating the intraframe data, and means for selecting a reference picture for the intraframe data. These aspects of the invention are identical to the components of the embodiment of FIG. 1, discussed above. For the sake of brevity, that discussion will not be repeated.

The present invention offers the benefit of memory savings, and hence lower cost. The memory savings results because reference pictures are stored as compressed representations, rather than being stored in decoded form. Only the region of interest needs to be stored in an uncompressed format, but this region is only a fraction of the full anchor frame.

The present invention further offers a method of achieving substantially lossless compression during the recompression step. Hence, fewer errors will result in the final picture, while still obtaining a higher ratio of substantially lossless compression.

The invention described above may be used in decoding a high definition TV (HDTV) picture, because the procedure is not dependent on input picture resolution. Another application for the invention is as a down converter, used to decode HDTV pictures, but display only standard TV pictures.

Figure 8:
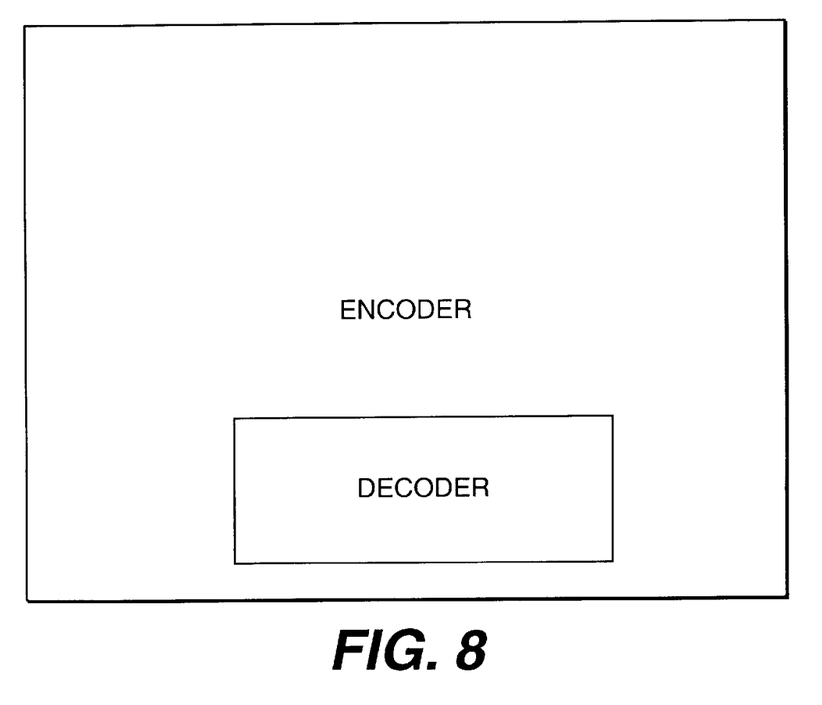
FIG. 8 is a block diagram depicting a decoder built into an encoder, consistent with the invention.

The teachings of the present invention related to reducing memory for storing anchor frames also may be applied to display memory reduction. Further, as will be obvious to one of skill in the art, the teaching of the present invention may also be applied to a decoder built into an encoder, as illustrated in FIG. 8.

Figure 7A:
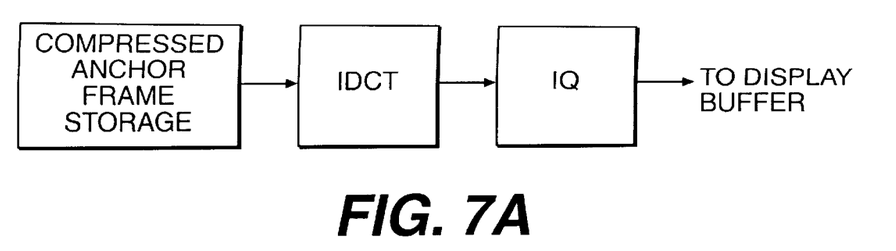
FIG. 7a is a block diagram depicting a portion of a compressed video decoder used for an anchor frame display.

For display memory, there are two cases to be considered: interlaced display and non-interlaced display. In an interlaced display, one frame of picture data is divided into odd and even lines, or fields, and displayed separately in time. Typically an entire frame of uncompressed video is stored in the display memory 20. At the right presentation time, either the odd or even lines are extracted for display. For the compression-based decoder, recompression is applied to all picture types that appear in the MPEG stream, namely the "I", "P", and "B" pictures. For the case of an interlaced display, as depicted in FIG. 7a, the "B" picture, which is not an anchor frame, must be recompressed.

Figure 7B:
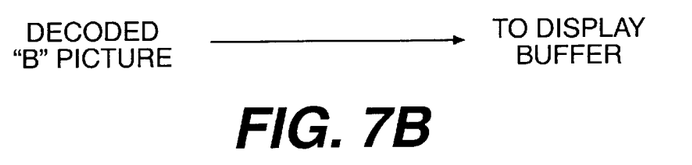
FIG. 7b is a block diagram depicting a portion of a compressed video decoder used for a non-anchor frame display.

In a non-interlaced display, the entire frame of video data is displayed at a single time. There is no separation of odd and even fields. Furthermore, in MPEG decoding, while decoding and presentation times for the "B" pictures are identical, the "I" and "P" pictures are decoded in advance of their display. Hence, no additional frame storage is required to display the "B" picture, because it is displayed as it is being decoded, with just enough storage for one horizontal row of macroblocks. For a non-interlaced display, as depicted in FIG. 7b, recompression is not required because the decode and presentation time for "B" pictures are identical.

Additional advantages and modifications will readily occur to those of ordinary skill in the art. Accordingly, the invention in its broader aspects is not limited to the specific details, representative apparatus methods and means disclosed herein. The scope of the invention is reflected in the attached claims and their equivalents. Accordingly, departure may be made from such details without departing from the spirit or scope of applicant's invention.

What is claimed is:

1. A method for decoding compressed video data, comprising the steps of:

receiving compressed video data in a channel buffer, said compressed video data including a quantization matrix, a quantizer scale, and a field/frame coding type;

decompressing said compressed video data and transferring said decompressed video data to a display memory;

recompressing a portion of said decompressed video data as intraframe data, to be used as an anchor frame, using a discrete cosine transform, said quantization matrix, said quantizer scale, and said field/frame coding type for the recompression, and storing said intraframe data, said quantization matrix, said quantizer scale, and said field/frame coding type in a compressed anchor frame storage;

motion compensating said intraframe data;

selecting a reference picture from said intraframe data; and decompressing a region of interest of said reference picture.

2. The method of claim 1, wherein said receiving, decompressing, recompressing, motion compensating, and selecting steps occur in a decoder built into an encoder.

3. A compressed video decoder comprising:

a channel buffer for receiving compressed video data, the compressed video data having a quantization matrix, a quantizer scale, and a field/frame coding type;

first decompressing means for decompressing the compressed video data and transferring the decompressed video data to a display memory;

discrete cosine transform means for recompressing a portion of the decompressed video data as intraframe data, to be used as an anchor frame, using a discrete cosine transform, said quantizer scale, said quantization matrix, and said field/frame coding type for the recompression;

anchor frame storage means for storing the intraframe data, said quantizer scale, said quantization matrix, and said field/frame coding type;

means for motion compensating the intraframe data;

means for selecting a reference picture from the intraframe data; and a second decompression means for decompressing a region of interest of said reference picture.

4. The decoder of claim 3, wherein said first decompressing means includes an inverse discrete cosine transform means, configured to time share as said discrete cosine transform means.

5. The decoder of claim 3, wherein the decoder is built into an encoder.

* * * * *